United States Patent

[11] 3,559,822

[72] Inventors  Uwe Lichtenford;
 Klaus Walkhoff, Essen, Germany
[21] Appl. No. 800,967
[22] Filed Feb. 20, 1969
[45] Patented Feb. 2, 1971
[73] Assignee Fried. Krupp Gesellschaft mit beschrankter Haftung
 Essen, Germany
[32] Priority Feb. 22, 1968
[33] Germany
[31] 1,556,636

[54] CONTAINER TRANSLOADING INSTALLATION
 11 Claims, 10 Drawing Figs.
[52] U.S. Cl. .................................................... 214/14,
 214/16.4
[51] Int. Cl. ............................................. B65g 63/00
[50] Field of Search ......................................... 214/14,
 16.4, 16.42, 16B

[56] References Cited
 UNITED STATES PATENTS
 3,232,455  2/1966  Fountain et al. ............... 214/16.4(2)
 3,379,321  4/1968  Weir ........................... 214/16.4(2)
 FOREIGN PATENTS
 446,825  5/1936  Great Britain ................ 214/16B Primary Examiner—Gerald M. Forlenza
Assistant Examiner—Frank E. Werner
Attorney—Walter Becker ABSTRACT: One system provides container storage space over which a travelling crane moves a spreader on a vertically guided boom. The containers can be quickly raised and lowered by remote control and a track of the travelling crane extends both over the storage space and over railway tracks and vehicle roads with respect to container transport dock area. Further system provision is made having silo storage compartments extending parallel to transport roller conveyors. An aisle remains between two silos and extending at a right angle relative to the transport roller conveyors. Two superimposed feeding and withdrawing roller conveyors extend into the aisle where a crane installation supported by the silos permits container movement substantially parallel to the transport roller conveyors between the feeding and withdrawing roller conveyors on the one hand and the compartments on the other hand. A carriage of the crane installation carries a spreader guided by two vertical beams of a frame which by means of an upper traverse with intervening rollers and rails rests upon two silos, and by means of a lower traverse with intervening rollers and rails laterally engages the silos. Traffic lanes extend through the silos below the compartments and automated control of container transloading occurs according to date storage and distribution for container placement according to metacentric and load stabilization requirements.

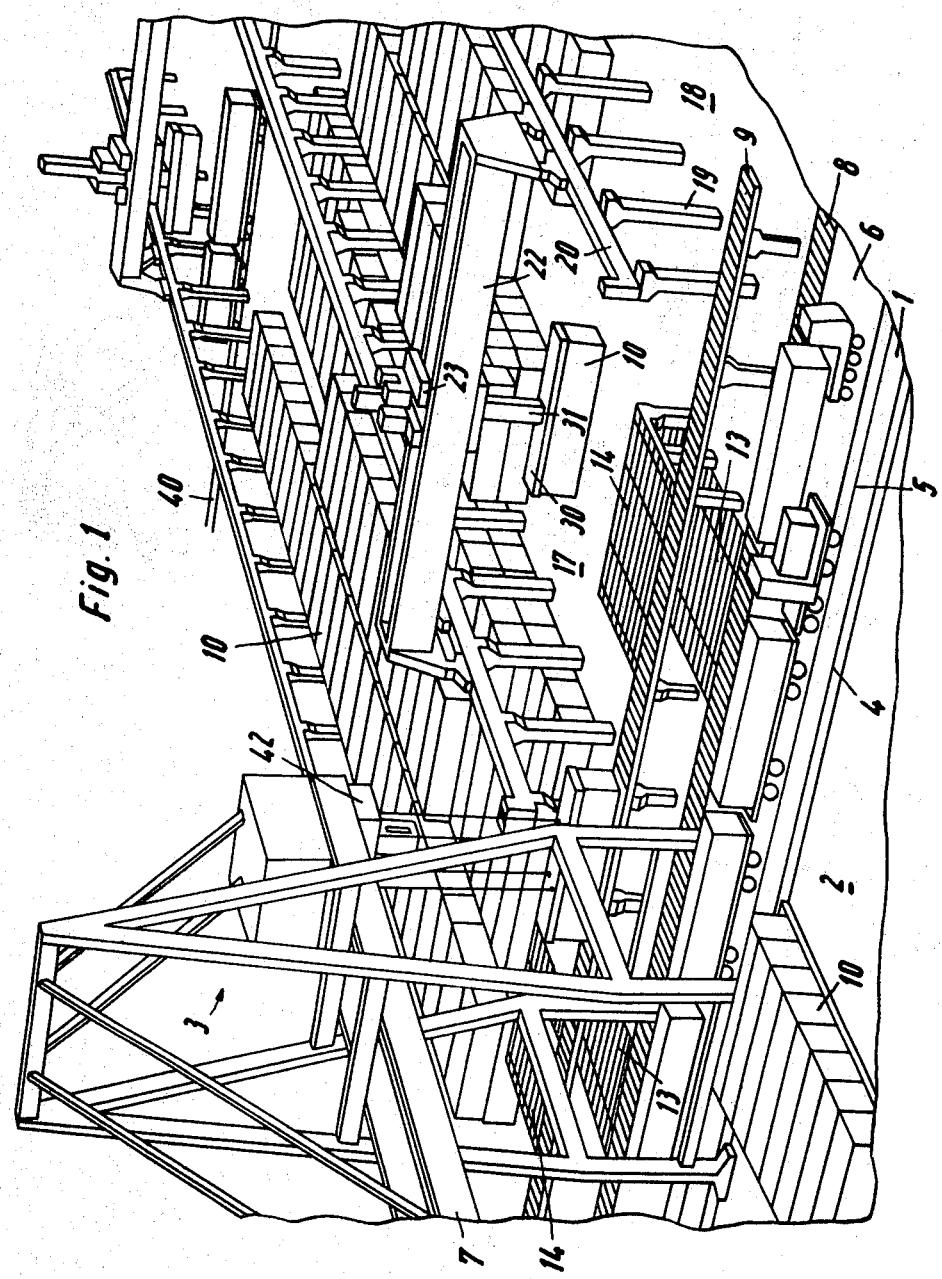

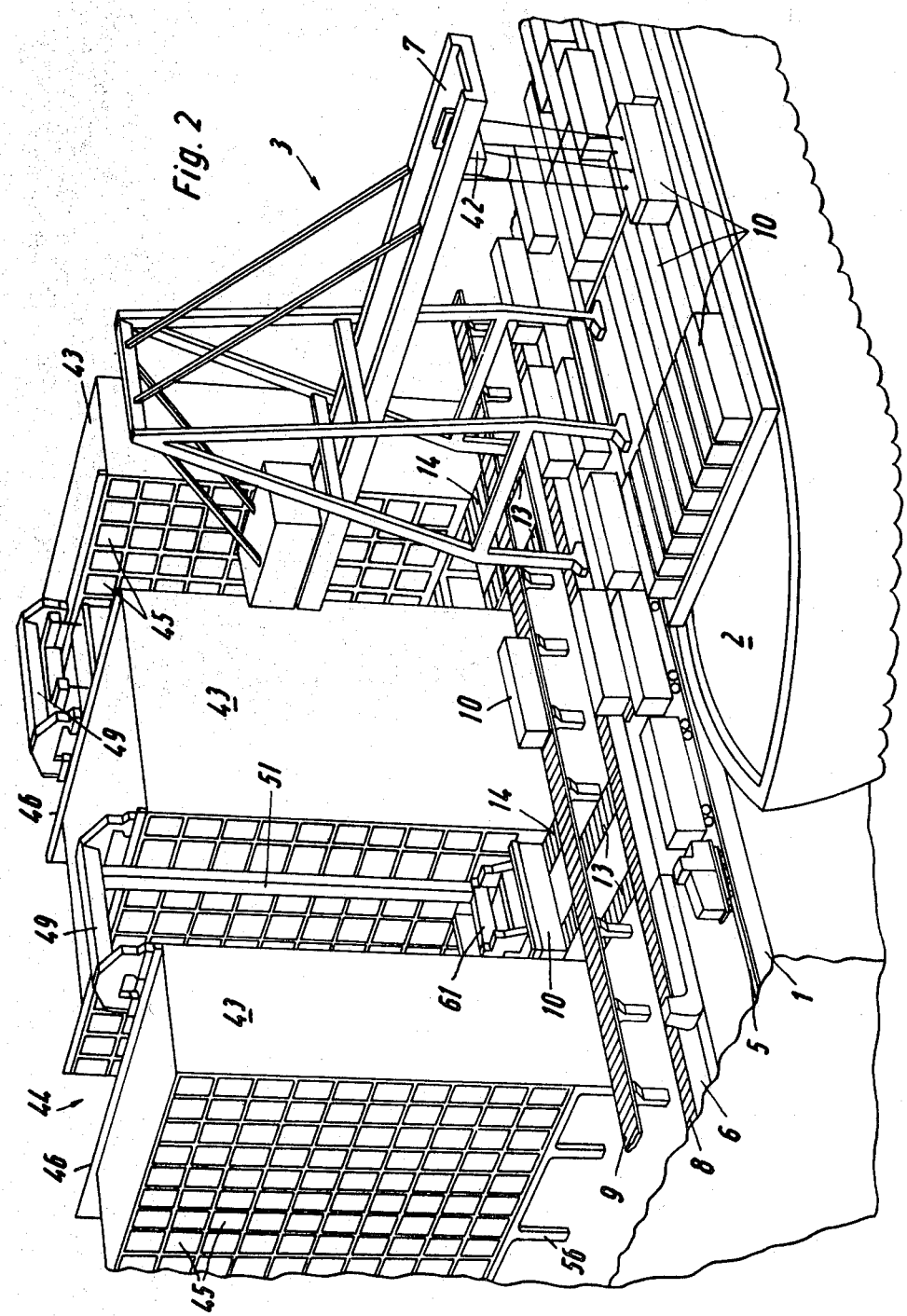

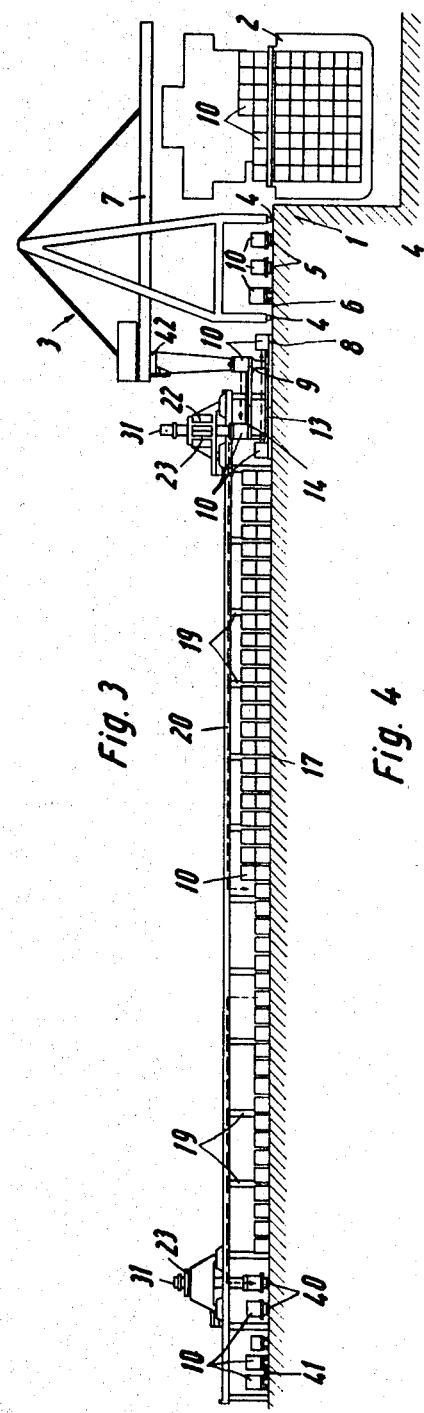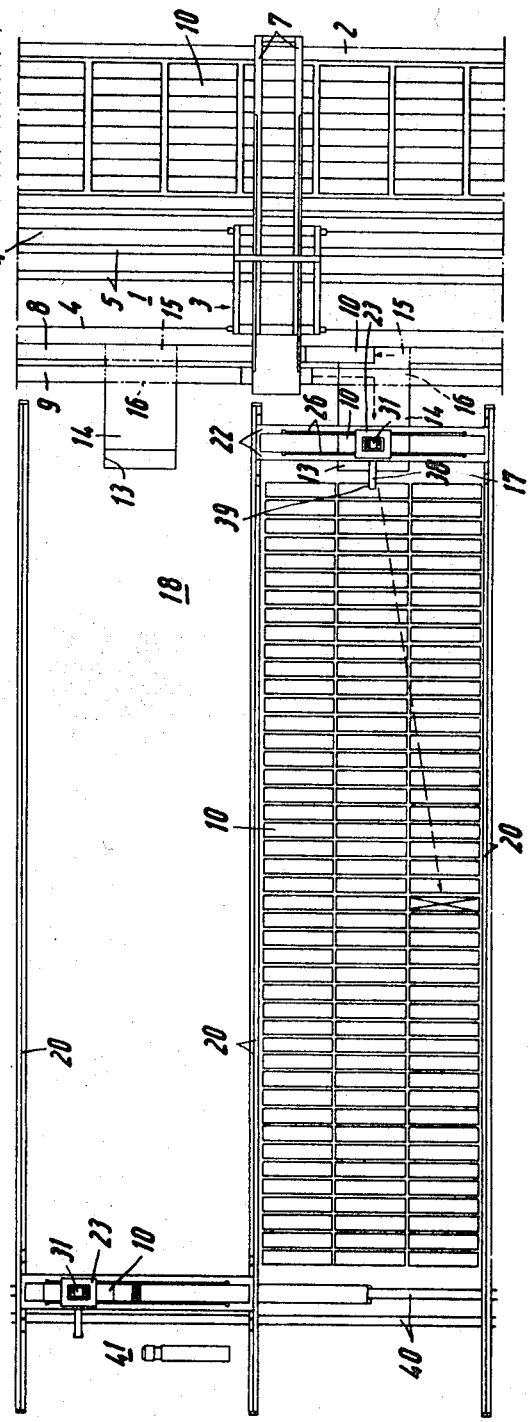

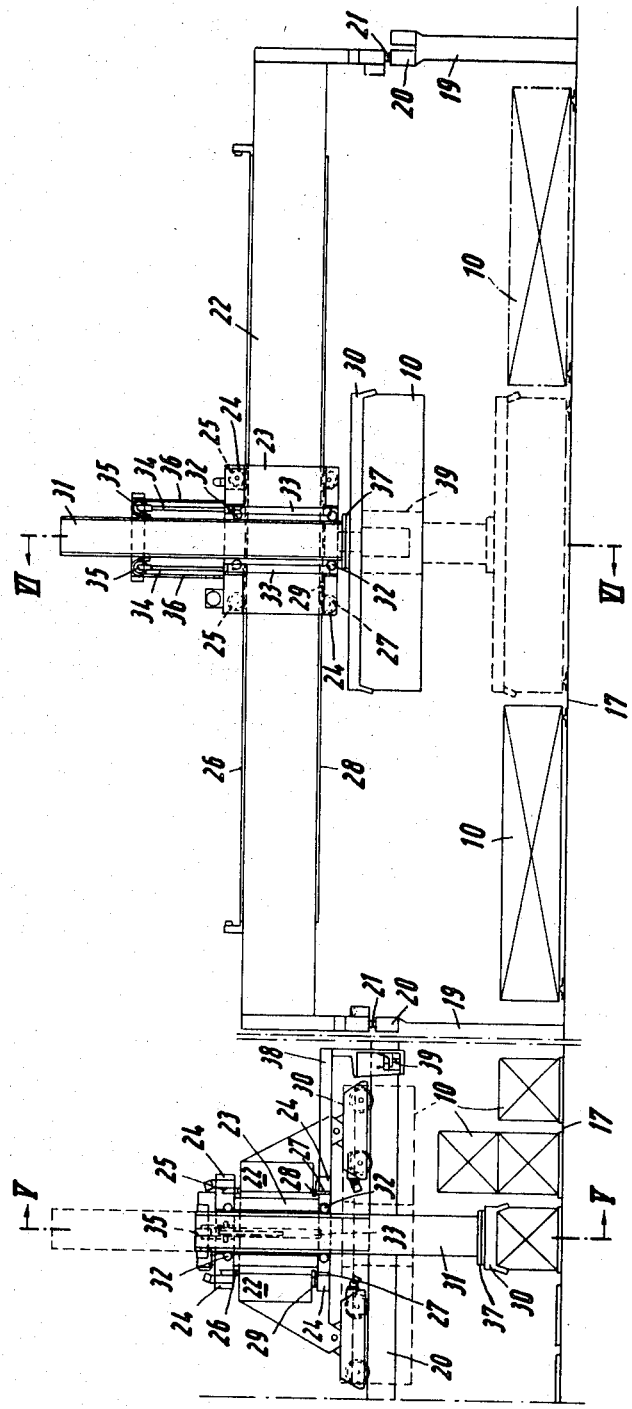

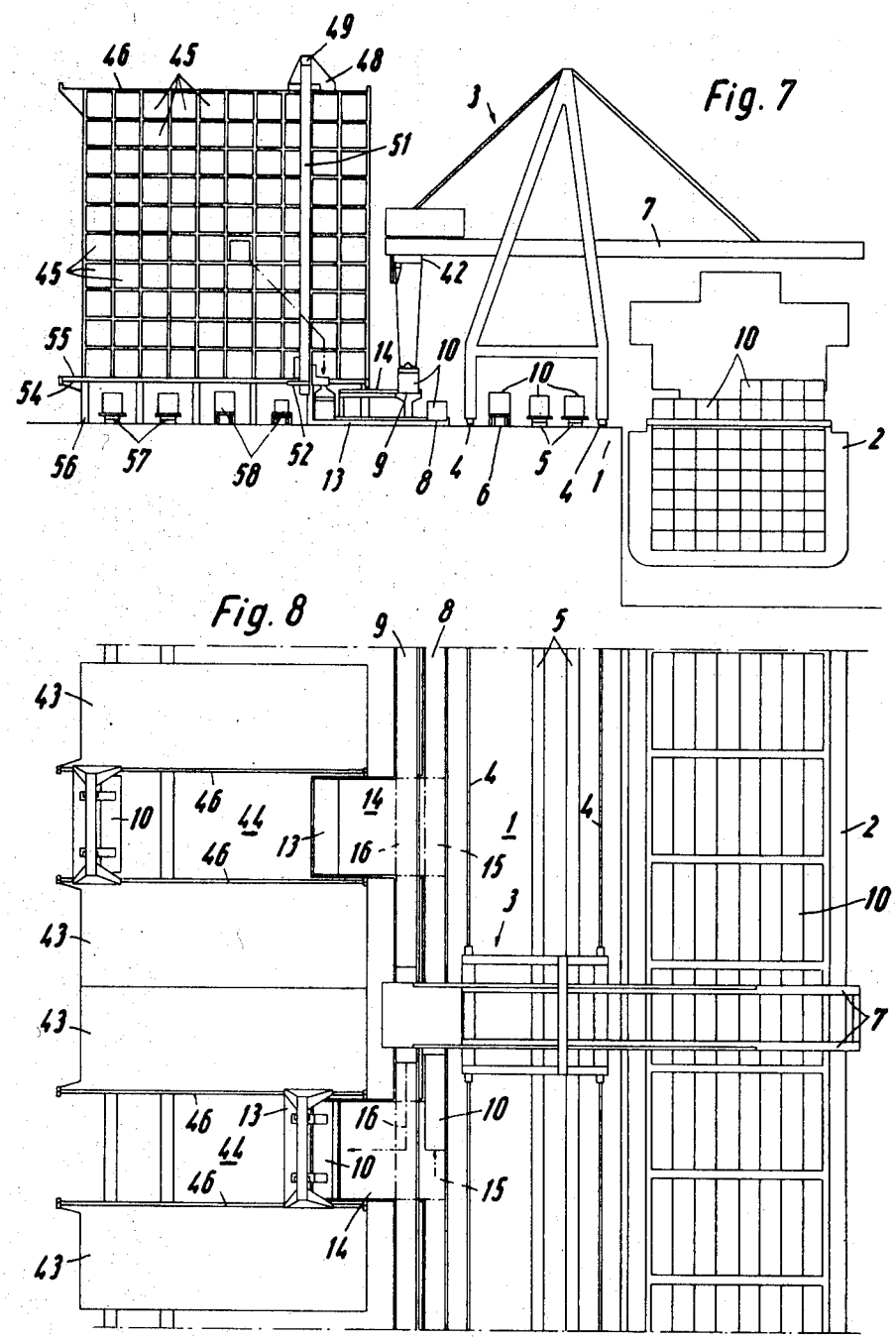

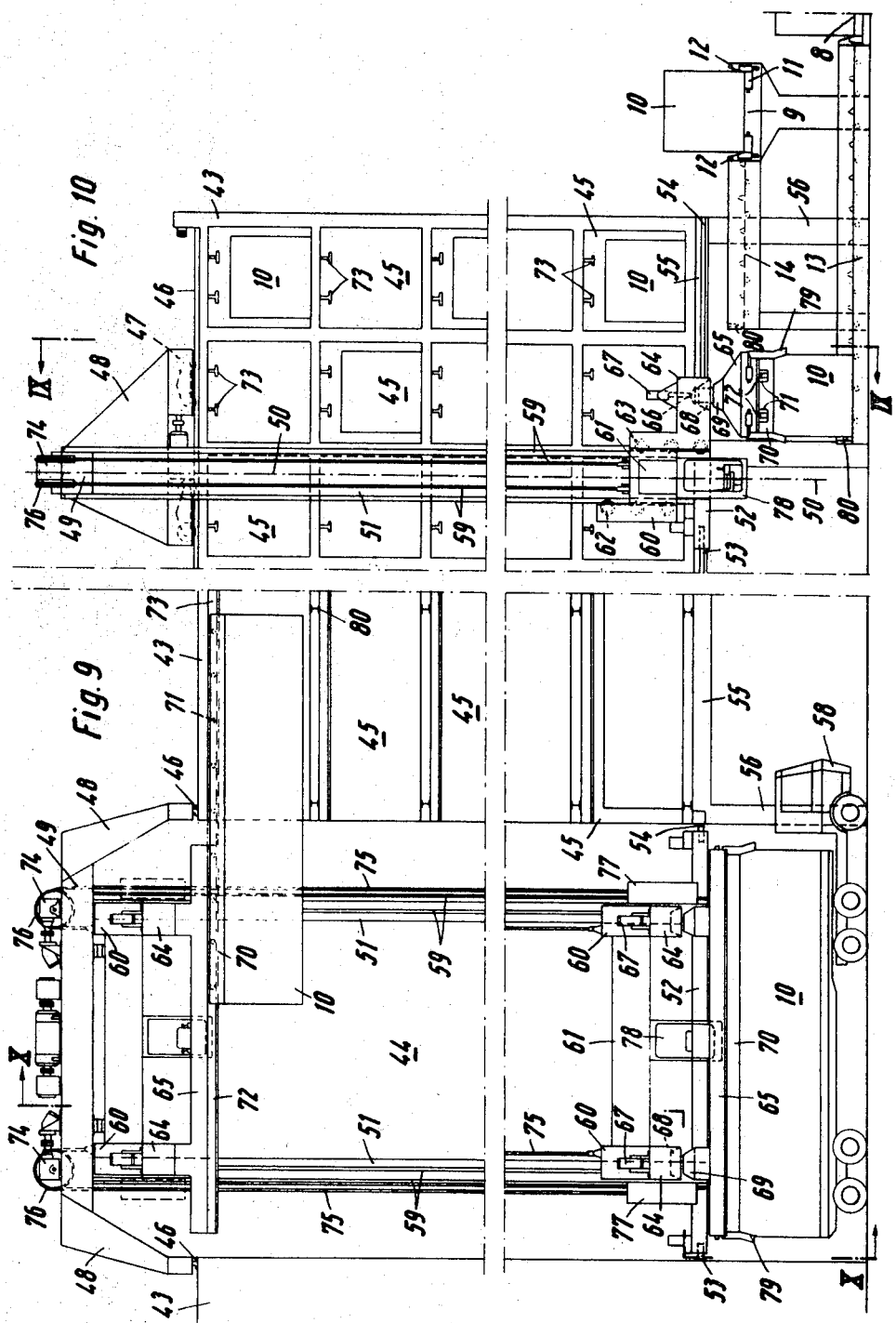

CONTAINER TRANSLOADING INSTALLATION

The present invention relates to a container transloading installation. The overseas transport of bulk material will according to all probability in the near future be effected with large special container ships. It is visualized that such ships will have a capacity of 1.000 so-called 40'-ISO-containers which are box-shaped containers with internationally standardized dimensions having a length of 40 feet. In order to operate such huge ships in an economic manner, the docking times must be reduced to a minumum.

Accordingly, it is an object of the present invention to provide transloading installations in harbors for the traffic of the above-mentioned containers in such a way that a minimum of time is required for loading and unloading such containers.

It is another object of this invention to provide transloading installations of the above-mentioned type which will be able to effect the loading and unloading within a minimum of space while time losses due to faulty human handling will be reduced to a minimum.

These and other objects and advantages of the invention will appear more clearly from the following specification in connection with the accompanying drawings, in which:

FIGS. 1 and 2 respectively illustrate isometric views of two types of transloading installations according to the invention.

FIG. 3 shows one type of transloading installation in cross section through the quay and a storage place.

FIG. 4 is a top view of the installation of FIG. 3.

FIG. 5 shows a travelling crane for use in connection with the installation of FIG. 3, this figure representing a longitudinal central section taken along the line V-V of FIG. 6.

FIG. 6 is a section taken along the line VI-VI of FIG. 5.

FIG. 7 illustrates the other transloading installation in a cross section through the quay and the adjacent place for the silos.

FIG. 8 is a top view of FIG. 7.

FIG. 9 represents a vertical section taken along the line IX-IX of FIG. 10 and passing through portions of two silos, said section extending along a plane parallel to the quay edge.

FIG. 10 is a section taken along the line X-X of FIG. 9 with the carriage occupying a different position.

In order to realize the above-mentioned objects, the invention starts with an installation for transloading containers between a ship at the quay and a storage installation with at least one container the carrier of which for the carriage extends on one hand over the ship and on the other hand over a hoisting device on the quay. The invention is characterized primarily in that two roller conveyors which form part of the conveying device and are located adjacent to each other parallel to the quay edge are provided with reversible driving rollers for containers located parallel to the quay edge. In conformity with the invention, these roller conveyors are by feeding and withdrawing roller conveyors connected to the storage place, said feeding and withdrawing roller conveyors having their driving rollers arranged at a right angle to the quay edge. The arrangement according to the invention is furthermore characterized in that that roller conveyor which is remote from the quay edge is located at a level which is so much higher than that of the other roller conveyor that containers can be conveyed from the other roller conveyor underneath the roller conveyor which is remote from the quay edge to the storage place and vice versa. The feeding and withdrawing roller conveyors which branch off from the lower transport roller conveyor are advantageously located below the feeding and withdrawing roller conveyors which branch off from the higher transport roller conveyor and extend relative to the last-mentioned feeding and withdrawing roller conveyors by at least the width of one container further to the storage place.

Concerning the design of the storage place, two different systems are suggested in conformity with the present invention. According to a first system, the containers are piled up on a storage place over which extends a travelling crane the carriage of which has a so-called spreader on a vertically guided boom. Such spreader comprises a rectangular frame which in a manner known per se is placed on a container to be lifted so that it is in alignment with the rectangular top side of said container, said rectangular frame or spreader being connected to the corners of the container by means of remote controlled clutches. In this connection it is important that a container lifted by such crane will in view of the vertical guiding of the boom in the carriage not carry out any pendulum-like movements as is the case with the customary cable suspensions so that the travelling crane can be operated with high acceleration and retardation of the carriage and the crane bridge. Due to the high travelling speed inherent thereto, a considerable saving in time will be realized when transloading the containers. The track of the travelling crane resting on supports and extending over the storage place may advantageously also extend over railway tracks and roads which are located remote from the transporting roller conveyors, preferably along that marginal area of the storage place which faces away from the transport roller conveyors.

According to the second system, the storage installation comprises silos which are provided with compartments extending parallel to the transport roller conveyors and intended for receiving containers. The silos are so arranged that between each two silos there will remain an aisle extending at a right angle with regard to the transport roller conveyors. Into said aisle there extend two superimposed feeding and withdrawing roller conveyors while in said aisle a crane installation supported by said silos is provided for moving containers which are approximately parallel to the transport roller conveyors between the feeding and withdrawing roller conveyors on one hand and the compartments on the other hand. Advantageously, a carriage of the crane installation which carries a spreader is guided by two vertical beams of a frame which by means of an upper traverse through the intervention of rollers and rails rests upon the upper sides of the two silos and by means of a lower traverse through the intervention of guiding rollers and rails is laterally resting against the silos. Preferably, traffic lanes, such as railroad tracks and roads, extend through the silos below the compartments.

Each of these systems makes superfluous the employment of steerable vehicles used heretofore in ports, such as gantry lift trucks, stacking trucks, mobile cranes, trailers, etc., inasmuch as the horizontal movement of the containers is by means of the mentioned cranes located in a second higher plane. As a result thereof, with an available space for the storage installation, the space required for the traffic lanes is percentagewise considerably reduced in favor of the container storing space, or expressed differently, with a given area for receiving a certain number of containers, the overall space requirement of the installation is considerably reduced. This is of particular importance when considering the ever increasing price of real estate. Moreover, the elimination of the traffic lane on the level ground represents a considerable saving in costs inasmuch as the work for building such traffic lanes and storage areas, the covering of the canalization, and the optical marking of the traffic lanes becomes superfluous. At any rate, an installation according to the present invention makes it possible that the portainer may rest at its respective place until it has emptied the loading space of the ship and/or has loaded containers thereinto. Independently of the areas of the storage place or the silos to which the containers are to be moved, no time losses will be incurred by having the portainer to be moved for transporting the individual containers or by having the containers to be transferred from the portainer to the transporting means leading to the storage place or vice versa in view of a mutual interference and a delay in the loading or unloading inherent thereto.

Referring now to the drawings in detail, in both systems illustrated therein a portainer 3 is displaceable parallel to the edge of the quay 1 at which a special container ship 2 has docked. The gantry frame work rests by carriage means on rails 4 between which railroad tracks 5 and a traffic lane 6 for trucks 6 are provided. The portainer 3 has a long girder or beam 7 for a carriage while that part of the girder or beam 7 which protrudes toward the water side extends over the ship 2 and by means of a nonillustrated joint can be folded upwardly in the vicinity of the frame work so that the beam 7 will not hit the superstructures on the ship when the portainer is displaced.

That portion of the beam 7 which extends over the quay extends over two transport roller conveyors 8, 9 which are arranged adjacent to each other and parallel to the quay edge. These conveyors 8, 9 have the same width as the containers 10 to be transported and are equipped with supporting rollers 11 shown in FIG. 10, the horizontal axes of rotation of which extend at a right angle to the quay edge. Some of the said rollers are coupled to reversible driving motors. On both sides the transport roller conveyors 8, 9 are bordered by guiding rails 12 (FIG. 10).

The transport roller conveyor 8 which faces toward the quay edge is located only slightly above the floor of the quay 1. The other transport roller conveyor 9 is by means of supports located so high that a container 10 can be passed therebelow by the transport roller conveyor 8. From the conveyors 8, 9 and in spaced relationship from each other there extend feeding and withdrawing roller conveyors 13, 14 at a right angle in the direction away from the quay edge. The width of the feeding and withdrawing roller conveyors equals substantially the length of a container 10. Each of the feeding and withdrawing roller conveyors 13 which branches off from the lower transport roller conveyor 8 is located below a feeding and withdrawing roller conveyor 14 and extends relative to the conveyor 14 by somewhat more than the width of a container in the direction away from the quay edge 6. The two feeding and withdrawing roller conveyors 13, 14 have supporting rollers which are partially driven and the rotary axes of which are arranged parallel to the quay edge. In those areas of the roller conveyors 8 and 9 which in FIGS. 4 and 8 are designated with the reference numerals 15 and 16 there are provided supporting rollers 11 with their axes of rotation at a right angle to the quay edge, and there are also provided supporting rollers with their axes of rotation parallel to the quay edge. These last-mentioned rollers are first located lower than the rollers 11 until a container fed, for instance, on the transport roller conveyor 8 passes to the area 15. When said container is intended to be transported away by means of the feeding and withdrawing roller conveyor 13, the supporting rollers in the area 15 are lifted with their axes of rotation parallel to the quay edge, so that the container will rest only upon the same and will now be able parallel to itself to be rolled at a right angle to the quay edge through the intervention of the feeding and withdrawing roller conveyor 8. It is, of course, also possible that in the areas 15 and 16 for transferring a container from one of the transport roller conveyors 8, 9 to one of the roller conveyors 13, 14, the transporting rollers with their axes of rotation at a right angle to the quay edge are lowered to such an extent that the container will be located only on the rollers with their axes of rotation parallel to the quay edge.

According to the system illustrated in FIGS. 3—6, adjacent the transport roller conveyors 8, 9 and on the quay side there are provided two closely adjacent storage places 17, 18. These storage places are at both sides bordered by crane tracks which are extending at a right angle to the quay edge and which are formed by beams 20 resting on supports 19, rails 21 being provided on said beams 20. A travelling crane is movable over each storage place 17, 18 while the crane beams is formed by two hollow boxes 22 spaced from each other. Between these boxes 22 there is mounted a carriage with a hollow box frame 23 which protrudes upwardly and downwardly beyond the hollow boxes 22 and at both sides by means of protrusions 24 extends above or below the hollow boxes 22. By means of the upper protrusions 24, the carriage rests through running wheels 25 on rails 26 which are placed upon the hollow boxes 22 at the upper inner edges thereof. The lower protrusions 24 have journaled therein wheels 27 which engage rails and which at the bottom side of the hollow boxes 22 are at the lower inner marginal areas thereof mounted in such a way that a lifting off of the running wheels 25 from the rails 26 will be prevented. Laterally at the heads of the rails 28 there are located guiding rollers 29 which by means of vertical rotary axles are likewise journaled on the lower protrusions 24.

In the chamber surrounded by the hollow box frame 23, there is vertically displaceably guided a beam which carries a spreader and is of square cross section. This guiding is effected at the four edges of said beam by means of upper and lower rollers 32. Movements of the beam 31 relative to the hollow box frame 23 in horizontal direction and tilting movements of the beam 31 relative to the hollow box frame 23 are prevented by the rollers 32. For purposes of lifting and lowering the beam 31, there are provided two hydraulic power devices the cylinders 33 of which are arranged within the chamber which is enclosed by the hollow box frame 23 and is arranged adjacent the beam 31 in said chamber. The piston rods 34 which protrude upwardly from the cylinders 33 have their upper ends provided with rollers 35. These rollers guide cables or chains 36 which are connected with one end to the beam 31 and with the other end to the hollow box frame 23.

The spreader 30 has its central portion connected to the lower end of the beam 31 through the intervention of a ball turntable 37. An operator's cab 39 is connected to a cantilever 38 which extends from the central portion of the hollow box frame 23 below one of the hollow boxes 22 at a right angle to the latter. From the cab 39 the operator is able to view the space below the hollow box frame 23. In FIG. 6 the spreader 30 is indicated by dot-dash lines and there is furthermore indicated a container 10 suspended on said spreader 30 when the spreader has been lifted as far as possible and has been turned to a position at a right angle to the hollow boxes 22. At the storage places 17, 18 and at the marginal portion which faces away from the quay, there are located two railway tracks 40 and a traffic lane 41 for motor vehicles. The crane travel path formed by the beams 40 protrudes above said tracks and said traffic lane.

The transloading device described above operates in the following manner. The portainer 3, as shown in particular in FIG. 4, occupies a position in which the carriage 7 extends over a storage space of the ship with containers 10. The containers have their longitudinal sides arranged parallel to the axis of the ship and are stacked above and adjacent to each other.

For purposes of unloading the ship, first one container 10 after the other is lifted out of the ship by means of the carriage 42 while the portainer 3 is at a standstill. The containers are one after another moved toward that end of the beam 7 which faces the quay and are there deposited on one of the two transport roller conveyors 8, 9. From here the containers may either by means of said two transport roller conveyors 8, 9 be moved to the storage place 17 or to the storage place 18, or one of the conveyors may move the containers to the storage place 17 while the other conveyor moves its containers 10 to the storage place 18. At any rate, the containers are by means of the correspondingly driven transport roller conveyors 8, 9 conveyed to respective feeding and withdrawing roller conveyors 14, 13. On these roller conveyors the containers are moved, following the above-mentioned adjustment as to height of one group of the supporting rollers in the areas 15, 16, at a right angle to the direction of the quay edge and to the respective storage place 17, 18 while their longitudinal sides remain parallel to the quay edge. Since the transport roller conveyor 8 moves the containers on the withdrawing or feeding roller conveyors 13 below the higher located feeding and withdrawing roller conveyor 14, the transfer of the containers to the storage place will be effected without the path of movement of the containers crossing each other so that the containers will not interfere with each other and that no awkward devices, such as switches, are necessary.

FIG. 3 illustrates how two containers within the area of the travelling crane 22, 23 are at the ends of the upper and lower roller conveyors 14, 13 offset with regard to each other in such a way that each of them is adapted to be lifted by the travelling crane independently of the other.

As will be evident from FIG. 4, for instance, for the storage place 17, by means of the travelling crane, for instance three rows of containers 10 may be stacked up closely adjacent to each other, for instance in two layers. At that end of the storage places 17, 18 which face away from the quay 1, the containers may be deposited from said stacks onto transporting means which move on the tracks 40 or on the traffic lane 41 for motor vehicles.

It is also possible that the containers which have been withdrawn by the portainer from the ship by means of the carriage 42 are not conveyed to the storage places 17, 18 but are deposited on vehicles which move on the tracks 5 and on the road 6.

The loading of containers into the ship which containers are withdrawn from the storage places 17 or 18 is effected in a reverse manner. As a matter of course, it is possible to withdraw containers from the vehicles on the tracks 5 or on the road 6. Primarily, however, containers which have been delivered by vehicles on rails 40 or by motor vehicles on the traffic lane 41 are by means of the travelling crane 22, 23 distributed over the storage places 17, 18. At any rate, the carriage 42 of the portainer as well as the travelling cranes 22, 23 are able to carry out their working cycles without interruption inasmuch as they do not interfere with each other.

By means of the roller conveyors 8, 9 and 13, 14 the containers 10 while maintaining the same aligned parallel to the quay edge are always in time moved to those places where they can be picked up by the carriage 23 of the travelling crane or the carriage 42 of the portainer without requiring waiting periods for these carriages. The containers move on the roller conveyors 8, 9 and 13, 14 at any time without interfering with each other.

It is even possible to operate the portainer with double working cycle of its carriage, more specifically, the carriage may during one cycle move a container withdrawn from the storage place to that end of the beam 7 for the carriage track which faces away from the water and deposite the container, for instance, on the higher located transporting roller conveyor 9, whereas during the succeeding cycle the carriage picks up a container from the lower located transporting roller conveyor 8, moves back with said container on the beam 7 and deposits the container on the storage place. This requires that previously a row of stacked containers was withdrawn from the storage place so that room is available for the stacking of containers in the storage place. In this instance, containers deposited in two feeding lines upon the upper transporting roller conveyor 9 are through the intervention of one of the withdrawing and feeding roller conveyors 14 moved into the reach of the respective travelling crane 22, 23 which then moves the container to a certain spot of the storage place while in the other feeding line containers which in the alternating working cycle are deposited by the travelling crane 22, 23 onto the lower feeding and withdrawing roller conveyor 13 are moved by the lower transporting roller conveyor 8 to the spot where they are picked up by the respective carriage 42 of the portainer.

In each case, the portainer remains at a standstill until the respective loading compartment of the ship has been completely emptied or completely filled, or, when employing the double working cycle, has been filled with and emptied of containers.

According to the transloading system shown in FIGS. 2 and 7—10, at the quay side and adjacent the two transporting roller conveyors 8, 9, a plurality of silos 43 are so arranged that between each two silos there remains a traffic lane 44 which extends at a right angle to the quay edge and the width of which equals approximately the width of a silo and is somewhat greater than the length of a container 10. The withdrawing and feeding roller conveyors 13, 14 extend into the lanes 44. Each silo has a plurality of stores each of which as a row of compartments 45. These compartments are so dimensioned that each of them can receive a container with play on all sides thereof. The said compartments are so aligned that their longitudinal axes are parallel to the quay edge. Those end faces of the compartments 45 which face the lanes 44 are open.

In each lane there is provided a crane installation which is supported by the two respective silos 43. On the roofs of said silos at the marginal areas facing the lane, rails 46 are mounted on which by means of wheels 47 there is movably arranged an upper traverse 49 which by means of supports 48 rests on a high frame. These supports 48 form the upper end of the frame the center plane 50 of which extends perpendicularly parallel to the quay edge. From the upper traverse 49, two box-shaped struts 51 of the frame extend vertically downwardly and have their lower ends rigidly interconnected by a lower traverse 52. The lower traverse 52 is by means of guiding rollers 53 and vertical pivot axles laterally supported on rails 54 which are connected to the two silos 43 at the level of the bottom 54 of the lowermost story provided with compartments 45. Below the floor 55 and between the pillars 56 there are provided passages through which railway cars 57 and trucks 58 can drive below the compartments of the silos.

Guided on the two struts 51 through the intervention of vertical rails 59 are two head members 60 of a carriage which comprises a hollow box 61 rigidly interconnecting the head members 60. Each head member 60 has that side thereof which faces away from the quay provided with an upwardly extending arm and with three superimposed guiding rollers 62 resting against a rail 59. At the oppositely located side, this head member extends downwardly and by means of three guiding rollers 63 one arranged below the other rests against a rail 59. At the same side, from the downwardly extending portion of this head member 60, a bracket 64 extends in the direction toward the quay edge.

On both brackets 64, there is suspended the upper portion 65 of a spreader. This is effected by means of a linkage system 66 each and by means of hydraulic power devices 67 respectively mounted on said brackets 64. The bottom side of each bracket 64 is provided with a pyramidal or frustroconical recess 68 into which fits a conical mounting 69 located at each end of the spreader portion 65.

Suspended on the upper spreader portion 65 is a lower spreader portion 70 which, in a manner known per se, is at the four corners adapted to be coupled to the top side of a container 10. The suspension of the lower spreader part 70 on the upper part 65 is effected by means of roller pairs 71 which are moved on two rails 72 with an inverted T-shaped profile in the longitudinal direction of the container which means parallel to the quay edge. The rails 72 are, if desired, displaceable to a limited extent in a longitudinal direction at the bottom side of the upper spreader part 65. In each compartment two rails 73 with the same profile and in the same arrangement with regard to each other are connected to the ceiling. The carriage formed by the head member 60 and the hollow box 61 may be lifted and lowered by means of two hoists 74. To this end, chains 75 connected to the head members 60 are guided in a positive manner by deviating rollers 74 located on the upper traverse 49.

Mounted on the hollow box 61 of the carriage and, more specifically, at the bottom side in the central portion of box 61, there is provided an operator's cab 78 in which the operator's seat is so located that the view of the crane operator is directed toward the spreader 65, 70. Therefore, the crane operator will be able to see and observe the movements of parts 65 and 70 of the spreader as well as the containers 10 suspended thereon.

The transloading of containers according to the last-mentioned system is effected in the following manner.

The portainer 3 operates in the same manner as with the system according to FIGS. 1 and 3—6. In other words, the portainer deposits successively the containers withdrawn from ship 2 onto the transporting roller conveyors 8, 9 and from these conveyors successively withdraws those containers which have been advanced from the storage place. During this operation, the portainer remains for a long time at one and the same spot with regard to a loading compartment of the ship. By means of the transporting roller conveyors 8, 9, the containers 10 to be stored are respectively by means of the feeding and withdrawing roller conveyors 13, 14 moved into the lane 44 between two silos 43. FIG. 10 shows a container 10 which has been moved to that end of the lower feeding and withdrawing roller conveyor 13 which protrudes with regard to the upper feeding and withdrawing roller conveyor 14. The crane installation is moved on rails 46 to a position in which the vertical longitudinal central plane of the spreader 65, 70 coincides with the vertical longitudinal central plane of the container. The carriage is lowered on the struts 51 to such an extent that the lower spreader part 70 together with the upper part 65 is lowered relative to the bracket 64 by means of hydraulic power devices 67, so that said part 70 can be placed on the container 10. The spreader is suspended on the brackets 64 by means of the linkage 66 so as to be freely movable in such a way that when being placed on the container 10 it can be aligned by means of guiding levers 79 relative to the container at the corners thereof. Thereupon, the spreader may be connected to the container at the corners thereof by means of remote controlled coupling members not illustrated. The guiding levers 79 are pivotally located at the upper spreader part 65 and can be pivoted by hydraulic devices. Thereupon, the spreader 65, 70 is with the container 10 lifted by means of the hydraulic power devices 67 until the pyramidal frustroconical extensions 69 are firmly pulled into the recesses 68. In this way a positive and thereby rigid connection is established between the spreader 65, 70 and the carriage. Therefore, with the succeeding travelling movements of the crane, pendulumlike movements of the container 10 will be avoided so that the operations can be carried out at high accelerations and retardations and consequently the containers can be moved at high speeds. The drive of the crane is effected simultaneously by motors which at the top drive some wheels 47, and at the bottom by means of motors which drive the rollers 53. The upper and lower motors are synchronized so that a tilting or jamming of the crane will be avoided.

By lifting the carriage and if necessary moving the crane, the container 10 is moved in front of one of the compartments 45 of one of the two silos 43 in such a way that the rails 72 located at the upper spreader part 65 are in alignment with the rails 73 of the respective compartment. Thereupon, the guiding levers 79 are pivoted to their release positions and the lower spreader part 70 is with the container 10 suspended thereon moved on rails 73 into the compartment 45. If necessary, the rails 72 are on the upper spreader part 65 displaced in such a way that the gap which existed between them and the rail in the compartment 45 is practically bridged as indicated in FIG. 9 by dot-dash lines. When the container is fully located in the compartment 45, it is lowered onto the traverses 80 in the bottom of the compartment by means of nonillustrated hoists located at the lower spreader part 70. This lowering is effected after the coupling members have been disengaged. The lower spreader part 70 is moved out of the compartment onto rails 72 of the upper spreader part 65 which, if desired, are moved to their original position with regard to the spreader part 65. In this way, the containers deposited by the portainer onto the transporting roller conveyors 8, 9 can in a minimum of time in conformity with a preconceived plan be distributed into the compartments of the silos 43.

In a corresponding manner, for purposes of loading the ship 2, the containers are in conformity with a preconceived plan removed from the compartments of the silos and by means of the roller conveyors 13, 14 and 8, 9 are conveyed to the portainer. Also during this operation, time losses during the transloading of the containers will be avoided. Furthermore, it is possible to make the portainer work with double-working cycle. To this end, its carriage 42 will with each back and forth movement of the beam 7 move a container removed from the ship 2 to the withdrawing area via the transporting roller conveyors 8, 9 or from there to the loading space of the ship.

FIG. 9 illustrates that by means of the crane installation located between each two silos 43 it is also possible to pick up containers which, for instance, were brought to the traffic lane 44 between two silos on a motor vehicle 58, said vehicle 58 driving below the silos 53 and between the pillar 56. In an inverse manner, containers may from any compartment 45 of one of the silos be deposited onto a vehicle 57 or 58 for being transported away.

With regard to the storage place system of FIGS. 1 and 3 —6, there may be added that when depositing a container onto a motor vehicle which is to be on a traffic lane behind one of the storage places 17, 18 by means of the respective travelling crane 22, 23, said container must be so located on the vehicle that that end face of the container which for purposes of filling or emptying said container of piece goods is to be opened is located at the rear end of the vehicle. This may, if necessary, be realized by rotating the spreader 30 of the travelling crane about the vertical axis of the boom 31. Therefore, it is not necessary that the respective motor vehicle arrives on the traffic lane 41 in a certain driving direction.

It is also possible that in the areas 15 and 16 of the transporting roller conveyors, instead of the above-mentioned supporting rollers with their axes of rotation located nonvariably at a right angle to the quay edge and unvariable parallel to the quay edge, to arrange supporting rollers in such a way that they can be pivoted about vertical axes from a position in which their axes of rotation are parallel to the quay edge into a position in which their axes of rotation are located at a right angle to the quay edge.

The spreader of the portainer carriage 42, of the travelling crane carriages 23 and of the cranes between the silos 43 are preferably so adjustable and the coupling devices are so designed that selectively containers of different dimensions may be grasped.

The design of a container transloading installation according to the invention offers favorable conditions for a far reaching automation of the container transloading operations. Such automation may with the above-described storage place-traveling crane and silo-crane installations be effected in the following manner.

a. With a system having storage place-traveling cranes:

The containers 10 which have been withdrawn from the loading space of the respective ship by the portainer 3 and which have been deposited on the transporting roller conveyors 8, 9 are automatically controlled at a speed which is adapted to the portainer working cycle and are moved in the direction toward the respective adjacent or predetermined feeding and withdrawing roller conveyor 13, 14 respectively. Here the oncoming containers are in a manner described above, moved parallel to themselves in a direction toward an abutment provided on that end of the feeding and withdrawing roller conveyors which faces away from the quay area. This abutment brings about a precise stay in one position which is the same for all containers. The storage place-traveling crane is by means of its carriage automatically moved above the container occupying the said position so that the spreader 30 can be automatically coupled thereto. Subsequently, the storage place-traveling crane will under the influence of a calculator controlled switch move the container to a predetermined depositing area. This will be realized by a precise division of the storage place into container depositing areas 40 parallel to the quay edge as well as by a numerically controllable crane.

b. With a system having silo cranes:

The container is as described above under a automatically moved into an abutment position for the feeding and withdrawing roller conveyors 13, 14 (see abutments 80 in FIG. 10). The silo crane the carriage mechanism of which together with the spreader likewise controls this position automatically, now couples the container 10 by hydraulically lowering the spreader 65, 70. The hydraulic lowering of the spreader has been provided in order to compensate for possible measurement tolerances or inaccuracies with regard to the abutment position of the container. After the spreader has been lifted with the container coupled thereto into the pyramidal frustroconical guiding means 68 of the travelling carriage supporting brackets 64, the precise positioning of the spreader and thereby of the container relative to the carriage mechanism has been established. This is the requirement for a numerically controlled approach to the silo compartments 45 which similar to the storage place are subdivided, but in this instance the division being vertically.

Both crane installations are thus controllable by a process calculator which takes over the following tasks:

1. To feed the containers brought in by ship, railroad and truck into empty storage places or empty compartments.

2. To store the data of the oncoming containers, such as receiver, weight, date when received, etc.

3. To provide for the optimum use of the crane installations by selecting or preselecting of the paths of movement for a certain number of requirements to be met. In this way, the shortest possible working cycle of the installation will be realized because, for instance, during periods where the traffic is light, those storage places and compartments will be filled which are located farthest away.

4. The calculation of the quantity of containers required for the loading of a ship with regard to the metacentric arrangement or the arrangement required for a load stability in the respective ship.

It is, of course, to be understood that the present invention is, by no means, limited to the specific arrangements shown in the drawings, but also comprises any modifications within the scope of the disclosure.

We claim:

1. An installation for at least in part vertically transloading of containers between a docked ship and a storage place with at least one oversized container-handling gantry crane of which the carrier for the carriage extends on one hand over the ship and on the other hand over a conveying device on a quay, comprising: two transport conveyor means which form part of the conveying device and are located adjacent to each other parallel to the quay edge, driving elements provided by said conveyor means and reversible to drive containers located parallel to the quay edge, feeding and withdrawing transport conveyors through which the storage place is connected with said transport conveyor means having said driving elements for conveying direction arranged at a right angle to the quay edge, one of said transport conveyor means which is remote from the quay edge being located at a level which is so much higher than that of the other transport conveyor means so that the containers can be conveyed from said other transport conveyor means underneath said one transport conveyor means which is remote from the quay edge to the storage place and vice versa, and storage-space-forming silos provided with compartments extending parallel to said transport conveyor means for receiving containers so that between two silos at a time a lane remains open at right angles to said transport conveyor means and said feeding and withdrawing transport conveyors extending into said lane and within which crane means supported by said silos can serve to move containers substantially parallel to said transport conveyor means between said feeding and withdrawing conveyors and said compartments.

2. An installation according to claim 1, in which said crane means includes a carriage and two struts perpendicular to a frame, a spreader carried by said carriage guided by said struts, said frame having an upper traverse upon wheels and rails supported upon the top of said silos and having a lower traverse over guiding rollers and rails supported laterally against said silos.

3. An installation according to claim 2, in which said carriage has bracket means, and said spreader is carried by said bracket means in such a manner that said spreader is disposed with respect to said frame in a direction toward said transport conveyor means.

4. An arrangement according to claim 3, in which data storage means for arrival or moving containers and associated automatic control means are provided for attaining optimum lane paths.

5. An arrangement according to claim 4, in which a further control means for loading ships is connected with an automatic distribution means for container placement according to metacentric and load stabilization requirements.

6. An installation according to claim 2, in which said spreader with respect to said carriage is capable of being raised and lowered and in uppermost position said spreader is connected with said carriage in form closing relationship.

7. An installation according to claim 2, in which said spreader comprises an upper part and a lower part, said latter part being adapted to be coupled to the containers and being movable with aid of rollers with respect to rails upon said upper part of said spreader longitudinally of said containers.

8. An arrangement according to claim 7, in which upper rails are provided in said compartments of said silos and are alignable with rails in said upper part of said spreader.

9. An arrangement according to claim 8, in which said rails in said upper part of said spreader are longitudinally adjustable.

10. An arrangement according to claim 9, in which said lower part of said spreader has a device by means of which a container forwarded to a compartment can be lowered onto an abutment and raised therefrom.

11. An arrangement according to claim 1, in which traffic lanes especially for train and truck vehicles extend through said silos and below said compartments.